(12) United States Patent
Cohen et al.

(10) Patent No.: US 12,164,641 B1
(45) Date of Patent: Dec. 10, 2024

(54) DESIGNATING AN OPERATIONAL MODE FOR AN INTEGRATED CIRCUIT

(71) Applicant: Amazon Technologies, Inc., Reno, NV (US)

(72) Inventors: Ori Cohen, Atlit (IL); Barak Wasserstrom, Mitzpe Aviv (IL)

(73) Assignee: Amazon Technologies, Inc., Reno, NV (US)

( * ) Notice: Subject to any disclaimer, the term of this patent is extended or adjusted under 35 U.S.C. 154(b) by 291 days.

(21) Appl. No.: 17/592,016

(22) Filed: Feb. 3, 2022

(51) Int. Cl.
| | |
|---|---|
| *G06F 21/00* | (2013.01) |
| *G06F 9/4401* | (2018.01) |
| *G06F 9/445* | (2018.01) |
| *G06F 15/78* | (2006.01) |
| *G06F 21/57* | (2013.01) |
| *G06F 21/76* | (2013.01) |

(52) U.S. Cl.
CPC .......... *G06F 21/575* (2013.01); *G06F 9/4406* (2013.01); *G06F 9/44505* (2013.01); *G06F 15/7807* (2013.01); *G06F 21/76* (2013.01)

(58) Field of Classification Search
None
See application file for complete search history.

(56) References Cited

U.S. PATENT DOCUMENTS

| | | | | |
|---|---|---|---|---|
| 5,937,154 A | * | 8/1999 | Tegethoff | G06F 11/261 |
| | | | | 714/E11.213 |
| 7,330,967 B1 | | 2/2008 | Pujare et al. | |
| 8,667,264 B2 | * | 3/2014 | Huang | G06F 9/4401 |
| | | | | 713/2 |
| 9,230,112 B1 | * | 1/2016 | Peterson | G06F 21/76 |
| 9,864,007 B2 | * | 1/2018 | Deutsch | G11C 29/4401 |
| 10,678,555 B2 | * | 6/2020 | Johansson | H04L 63/062 |
| 11,615,190 B2 | * | 3/2023 | Liu | G06F 21/64 |
| | | | | 713/2 |
| 11,650,741 B2 | * | 5/2023 | Kloth | G06F 21/72 |
| | | | | 726/26 |
| 11,720,683 B2 | * | 8/2023 | Herberholz | G06F 21/575 |
| | | | | 713/2 |
| 2005/0125407 A1 | * | 6/2005 | Kraus | G06F 21/575 |
| 2005/0228980 A1 | * | 10/2005 | Brokish | G06F 12/12 |
| | | | | 713/2 |
| 2010/0017659 A1 | * | 1/2010 | Dos Remedios | G06F 21/575 |
| | | | | 714/36 |
| 2010/0042824 A1 | * | 2/2010 | Lee | H04L 9/0894 |
| | | | | 713/168 |
| 2012/0253731 A1 | * | 10/2012 | Akdemir | G01R 31/318371 |
| | | | | 702/119 |
| 2015/0046970 A1 | | 2/2015 | Shimizu | |

(Continued)

OTHER PUBLICATIONS

Non-Final Office Action issued in U.S. Appl. No. 17/695,630, dated Jan. 5, 2024.

*Primary Examiner* — Maung T Lwin
(74) *Attorney, Agent, or Firm* — Hogan Lovells US LLP

(57) ABSTRACT

An operational mode can be designated for a computing device, such as an integrated circuit. In particular, an input signal may be used to determine an operational mode, which may lead to bypassing or otherwise restricting one or more boot operations to permit use of the computing device. Such an approach provides improved flexibility to permit use of the computing device for testing or debugging while maintaining security features used during other operational modes.

20 Claims, 7 Drawing Sheets

(56) References Cited

U.S. PATENT DOCUMENTS

| | | |
|---|---|---|
| 2018/0285094 A1 | 10/2018 | Housel et al. |
| 2020/0081846 A1* | 3/2020 | Brokish .................. G06F 21/74 |
| 2020/0218544 A1* | 7/2020 | Ganesan ............. G06F 13/4221 |
| 2020/0302090 A1 | 9/2020 | Doerr et al. |
| 2021/0319110 A1 | 10/2021 | Edery et al. |
| 2021/0406380 A1* | 12/2021 | Poulard .................. G06F 21/74 |
| 2023/0315913 A1 | 10/2023 | Chandra et al. |

\* cited by examiner

DESIGNATING AN OPERATIONAL MODE FOR AN INTEGRATED CIRCUIT

BACKGROUND

Many existing computing systems utilize various integrated circuit components, such as system on chip (SoC) components. Often, SoCs include various security protocols to ensure that authorized users have access to different features, such as features that may permanently change one or more aspects of SOCs. High security features may be protected by one or more booting sequences, such as measured boot, which may use remote attestation in order to verify different stages of the boot process. While these features provide high levels of security, they also reduce flexibility with respect to testing of the SoC along different stages of a supply chain.

BRIEF DESCRIPTION OF THE DRAWINGS

Various embodiments in accordance with the present disclosure will be described with reference to the drawings, in which.

DETAILED DESCRIPTION

Figure 1:
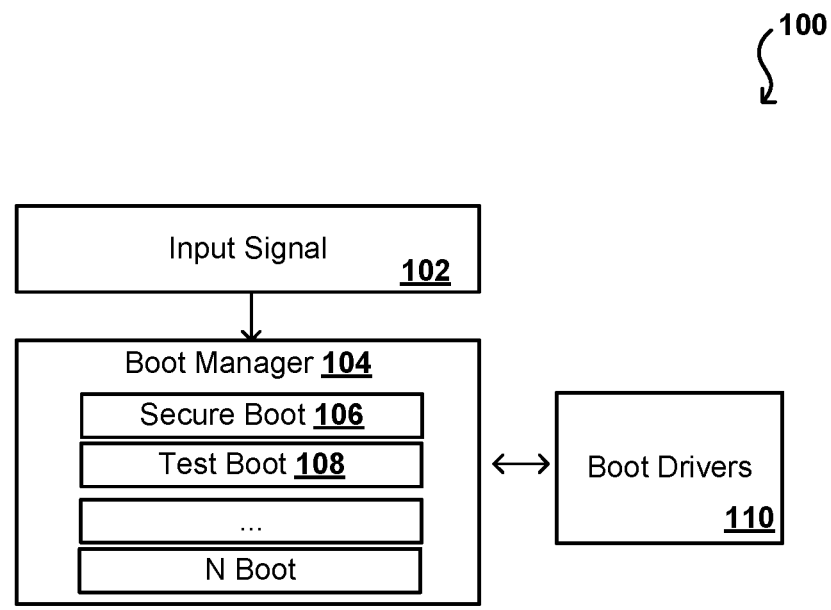
FIG. 1 illustrates components of a management architecture that can be utilized in accordance with various embodiments.

Approaches in accordance with various embodiments can be used to select an operation mode to a computing device or component, such as an integrated circuit (e.g., a microprocessor, or a system on chip (SoC)). In particular, various embodiments can use one or more input signals to determine a desired operation mode for the SoC. Responsive to the input signal, the SoC may then be configured to operate in one or more different operation modes. Different operation modes may have different security features and permissions for the user, but may otherwise maintain functionality of the SoC to enable operations such as testing along a supply chain. Such an approach provides improved flexibility compared to systems that rely on only enabling operation of the SoC under a high security mode, which may make testing or other operations along intermediate portions of a supply chain difficult.

Various embodiments may designate one or more different operation modes, such as a full operational mode and a debug or testing mode, among other options. In full operational mode, the SoC may operate as normal with maximum security features, such as a measured boot (e.g., a boot that uses remote attestation), verified boot, or other features. Additionally, full operational mode may permit the user to access cryptographic information (e.g., keys, hashes, etc.) and/or to make permanent changes, with security implications, to the SoC and its boot processes, such as by burning a fuse or performing some other operation that may be associated with non-volatile memory (NVM). In a debug or testing mode, the SoC may permit full operation of the device, but may block or otherwise disable security features such as measured boot, access to cryptographic information, abilities to make permanent changes (e.g., permanent changes with security implications), and the like. Accordingly, access during the debug or testing mode may permit testing of software or other features of the device without permitting the device to connect to one or more networks, and may also block permanent changes such as fuse burning and the like. In this manner, at start up, an operation mode may be selected based, at least in part, on present circumstances of the device's operation.

In at least one embodiment, systems and methods of the present disclosure are directed toward hardware implementations to control or select a boot process for a computing device, such as an SoC. The input system may be considered a bootstrap, where one or more properties of the input signal determine, at least in part, a boot sequence for the computing device. Various embodiments may block, skip, or otherwise disable one or more boot functions responsive to the input bootstrap. As will be described below, a secure boot may enable a measured boot process along with one or more additional boot drivers. In contrast, a debug or testing boot may disable measured boot and one or more features associated with high security or cryptographic operations.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein. Although many embodiments are described with respect to an SoC, further embodiments can use integrated circuits more generally.

During a boot process, boot-time drivers can be loaded into a boot-time environment, such as a driver execution environment (DXE), and boot hardware configuration data can be stored to protected or secured resident or non-volatile memory on the device. A separate runtime loader environment (RLE) can be loaded that can use this boot hardware configuration data to load and apply runtime drivers, storing runtime configuration data to this protected memory. In this way, the runtime execution model code corresponding to those runtime drivers can be made accessible to an operating system (OS) or processing component (e.g., an integrated circuit, or an expansion card with processing capability) of the computing device, for example, via one or more runtime application programming interfaces (APIs).

For many computing devices, the devices will go through a process of hardware initialization and setup before an operating system (OS) is able to be executed after a boot or reboot action is triggered. At least a portion of this process is driven by a system Basic Input/Output System (BIOS) component, such as may take the form of an EEPROM or flash ROM on a motherboard of a computing device that contains relevant code or instructions. The BIOS in many systems is the lowest level of software that interfaces with the device hardware, and provides an interface through which an OS kernel or bootloader can communicate with that hardware. At startup or boot, the BIOS can initiate a power-on self-test (POST) process to detect, initialize, and test hardware on the device. After this POST Process has completed, the BIOS can then begin to boot the computing device with the determined settings, with control eventually being handed to an OS that is executed on the device. For devices that utilize a conventional Unified Extensible Firmware Interface (UEFI)-based boot process, there can be three phases to such a boot process, as may include a security phase, an initialization phase, and a driver execution environment (DXE) phase.

However, as noted above, it may be desirable to disable or skip one or more steps of the boot process, such as to disable a security step such that the computing device can no longer access a network environment or to block access to different cryptographic material or actions. FIG. 1 illustrates an example architecture 100 of a computing component, such as circuitry or logic forming a portion of an integrated circuit, that can be utilized in accordance with various embodiments. In this example, an input signal 102 may be directed toward a boot manager 104. The boot manager 104 is represented as a block (e.g., circuitry, logic sets, etc.) positioned to receive the input signal 102. As shown, the boot manager 104 may represent a physical, hardware lock that, responsive to the input signal 102, makes a determination to select one or more different boot processes for a computing device. In this example, four different boot processes are shown, but it should be appreciated that more or fewer may be utilized within the scope of the present disclosure.

The illustrated boot manager 104 may determine, based at least in part on the input signal 102, whether to execute a secure boot 106 (e.g., a managed boot) or a testing boot 108 (e.g., a demo boot, a debugging boot, etc.) based, at least in part, on the input signal 102. For example, one or more properties of the input signal 102 may determine which boot process is instituted for the computing device. For example, selection of a particular boot process my cause one or more boot operations to initiate, which may include various tasks or execution of certain boot drivers 110. As noted above, the determination may be due to a hardware-based property of the input signal 102, such as a voltage level, a duration of a signal, or the like.

The selected boot operations, such as the drivers 110, may determine whether one or more different features are skipped, enabled, disabled, etc. during the boot process. For example, during secure boot 106, a managed boot operation may begin where an attestation process permits access to a network resource, allows a user access to various cryptographic secrets, and permits permanent changes to NVM, such as burning of fuses. In at least one embodiment, permanent changes with security implications to the boot process may be enabled when the device is operated within the secure boot operational mode. In contrast, during test boot 108, managed boot may be blocked such that no attestation can take place, and as a result, the device is not permitted to access a network resource. Furthermore, test boot 108 may block or otherwise restrict access to cryptographic secrets and prevent changes to NVM. However, other functionality of the device may be permitted, such as access to an operating system, loading of software, debugging, and the like.

Embodiments of the present disclosure may provide improved flexibility for different devices, such as SoC components that may be transported along different segments of a supply chain, such as foundries, IP and service providers, and packaging, assembly, and test operators. At various levels, different parties, such as chipmakers, distributors, service providers, etc. may have access to or control over different components. For example, maintaining high levels of security by requiring secure boot early in the supply chain reduces a number of locations where testing and debugging may occur due to the increased security requirements. Alternatively, keeping the SoC "open" or available along the supply chain may present security risks. Embodiments of the present disclosure permit fuse burning and high security in relatively early stages of the supply chain. They also permit testing and debugging operations at different levels of the supply chain while maintaining security protocols in place. Furthermore, various embodiments provide for a system that can easily be rebooted in a different operation mode, and as a result, security protocols may be adjusted at different levels of the supply chain.

Figure 2:
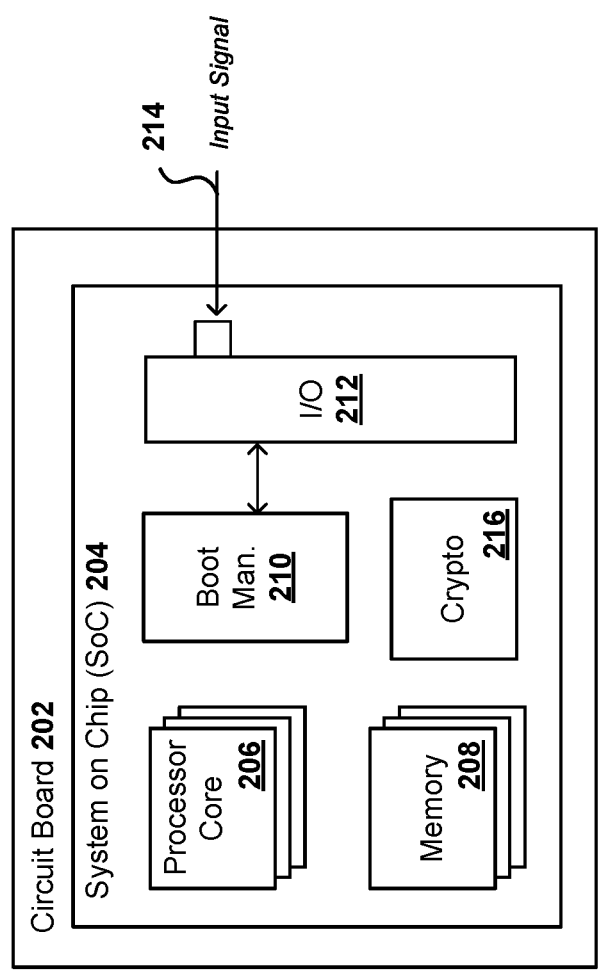
FIG. 2 illustrates an example computing system utilizing a boot manager that can be utilized in accordance with various embodiments.

FIG. 2 illustrates an example computing system 200 incorporating a boot manager that can be utilized in accordance with various embodiments. This example includes a circuit board 202 including a SoC component 204, as may be inserted into a computing device. This SoC may be configured to perform specific tasks on behalf of the computing device, using one or more processors, processor cores 206, or microcontrollers on the SoC, as may include one or more central processing units (CPUs), graphic processing units (GPUs), digital signal processors (DPSs), or cores of those components. The SoC 204 can include one or more types or instances of memory 208 or storage, as may include flash memory. The SoC 204 may also include communication buses and circuitry, as may relate to one or more application-specific integrated circuits that may each be customized for a particular use. The SoC may also have one or more I/O components that allow for data input and output, as well as the providing of control signals, that may come from components on the circuit board 202, a computer into which this board is installed, or an external device. Other system configurations can be used as well within the scope of various embodiments, such as a system on board (SoB) configuration that may have similar interfaces.

The early behavior of such an SoC after reset, or another such action, can be defined using a physical interface, such as a set of bootstrap pins. In at least one embodiment, these pins can be general purpose I/O pins, or GPIOs. The state of these pins (e.g., high or low) at boot or reset can determine important features of the microcontroller, such as output voltages to one or more components. Accordingly, systems and methods in accordance with various embodiments may utilize one or more bootstrap pins in order to determine an appropriate boot sequence for the SoC 204.

A boot manager 210 is arranged between a GPIO 212 and the remaining components of the SoC 204, such as the processor cores 206 and the memories 208. The boot manager 210 may be positioned to receive or otherwise direct an input signal 214 received at the GPIO 212 and then determine, based at least in part on the signal, one or more boot processes for the SoC 204. As noted above, the determination may be based on states of one or more bootstrap pins associated with the GPIO 212, and as a result, a hardware configuration may be utilized to select the boot process as opposed to one or more different software solutions.

In this example, the boot manager 210 may direct different commands or instructions, such as permitting transmission of signals or of voltages to one or more components, based at least in part on the input signal 214. For example, if the input signal 214 corresponds to a secure boot process, the boot manager 210 may permit one or more boot processes to access a cryptographic module 216, which may include one or more secrets or cryptographic information associated with SoC 204. Furthermore, the cryptographic module 216 may also be associated with logic components that permit the burning of fuses. It should be appreciated that the cryptographic module 216 may be a memory component, such as NVM, or may be associated with memories 208. Furthermore, the cryptographic module 216 may also correspond to different hardware components, such as one or more fuses. When the input signal 214 indicating a secure boot is received, the boot manager 210 may then initiate a secure boot process, which may include operations such as measured boot, access to cryptographic module 216, permissions to adjust or change boot operations, permissions to make permanent changes to NVM, and the like. In contrast, if the input signal 214 corresponds to a test or debugging signal, the boot manager 210 may block or prevent one or more boot processes from accessing one or more features of the SoC 204, such as the cryptographic module 216, one or more portions of memory 208, and the like.

In accordance with present embodiments, different operations, tests, and the like may be performed on the SoC 204 at different stages of a supply chain. For example, as increased security protocols become desirable, the SoC 204 may be booted in a secure operating mode and then additional security features, such as burning of fuses or others, may be added at different stages. However, such a configuration would not change the operation of the SoC 204 when booted in a testing or debugging mode because in such a mode of operation, the user would not have access to the high security, cryptographic functions of the SoC 204. Accordingly, high-level operation of the device (e.g., loading software, testing, etc.) remain enabled while keeping sensitive portions of the SoC 204 secure. Furthermore, such systems also reduce the complexity of burning fuses at different supply chain stages or by implementing different methods to try and test and debug a secure SoC. As such, systems and methods may be directed toward disabling one or more security functions, such as measured boot, abilities to burn fuses, access to cryptographic information, etc. while operating in a testing or debugging mode. The unsecured access would enable a user to use many aspects of the system, but would prevent a bad actor from harming or modifying the system due to being restricted from accessing a secure network or from making permanent changes to the SoC. On a subsequent boot operation, a different operational mode may then be selected. Subsequent boot operations would have no "memory" of a previous operation, and as such, numerous different secure or testing boots can be performed. However, it should be appreciated, in various embodiments, testing boots may be restricted or prevented by one or more actions performed during a secure boot because the secure boot enables a user to make permanent changes with security implications to the SoC, such as burning of fuses or changes to the boot process overall, which may include ending operation using the test boot.

Figure 3:
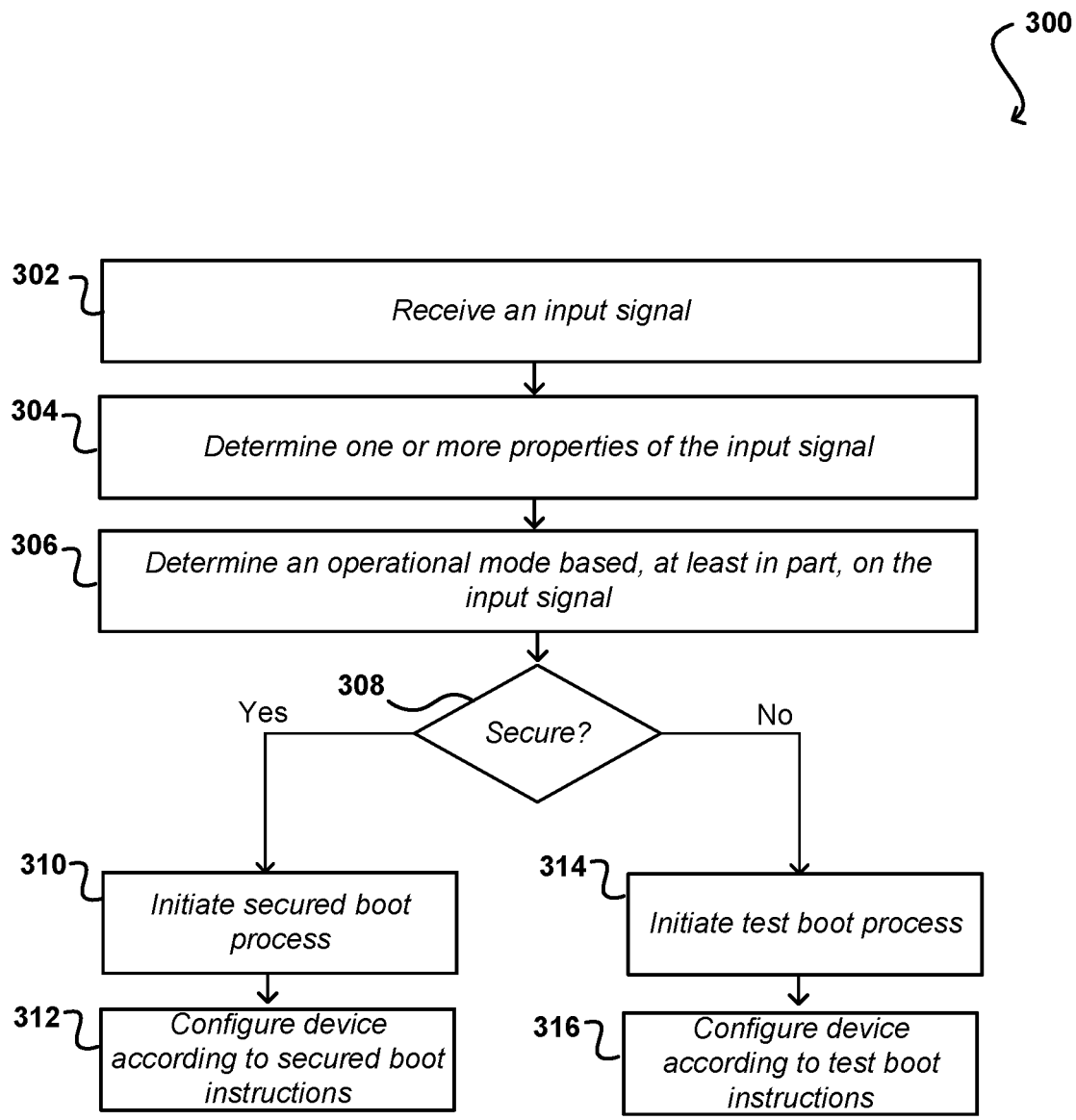
FIG. 3 illustrates an example process for selecting an operating mode with a bootstrap input signal that can be utilized in accordance with various embodiments.

FIG. 3 illustrates an example process 300 for selecting an operating mode that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, while this example is discussed with respect to an SoC device, it should be understood that aspects of various embodiments can be used with other computing and processing devices as well, or for other methods of data transfer. In this example, an input signal is received 302. In at least one embodiment, a user, such as a tester or operator of the SoC device, may provide the signal. The input signal may be received after a reset or restart event for the device and may correspond to signal to initiate a restart. The input system may also be received prior to a restart, such as during use in an operational mode, such that the input signal corresponds to a restart signal for how to boot the system on a subsequent boot. In at least one embodiment, the input signal is a bootstrap that determines, at least in part, a boot sequence for the receiving device, such as an SoC. The input signal may include information to enable configuration of the device at restart.

One or more properties of the input signal may be determined 304. For example, the properties may correspond to information that is transmitted to one or more pins of a GPIO, among other features. It should be appreciated that the properties may be determined or evaluated prior to the execution of a boot series or software associated with a computing device, such as a SoC. For example, the initial information associated with the input signal may be a factor in determining a boot sequence prior to execution of software. An operational mode for the device may be determined based, at least in part, on the input signal 306. For example, a first set of pins may be associated with a secure boot while a second set of pins may be associated with a test boot, among other options. The operational mode may be utilized during one set of operations or use of the device and then may be redetermined when the system is restarted.

It may be determined whether or not the operational mode is a secure operational mode 308. A secure operational mode may correspond to one or more operational modes that utilize cryptographic or attestation techniques in order to provide access to NVM or to make permanent changes to the system. By way of example, a secure operational mode may correspond to a mode that utilizes a measured boot operation with remote attestation of a certain configuration. This measured boot may permit access to one or more networks, provide the ability to permanently change one or more features of the system, such as features associated with NVM or fuse burning, and may permit access to cryptographic information. Alternatively, a non-secure operational mode may correspond to a testing or debug mode, where functionality of the device is unhindered, but access to one or more secure systems may be blocked or restricted.

If it is determined that the input signal corresponds to a secure operational mode, a secured boot process may be initialized 310. In at least one embodiment, secure boot may correspond to one or more secure boot features that either determine whether a secure boot process is initiated and/or provide access to security assets in runtime. As noted, a secure boot may correspond to a measured boot that provides additional layers of security to maintain integrity of different features associated with the device. Moreover, secured boot may provide access to various security assets, such as cryptographic materials, the ability to change boot operations, and the like. The device may then be configured according to secured boot instructions 312. For example, the configuration may include initiating the measured boot process, applying one or more settings to the device, providing access to certain security assets, and the like. There-after, a _____ (?) can utilize various features of the device according to permissions provided by the secured boot process.

If the input signal is not associated with the secure operational mode, the system may still configure the device to accept one or more operating instructions, but the user will be limited to only those functional systems and not be able to access or utilize features incorporated with the secure boot process. For example, a test boot process may be initialized 314. As noted, the test boot may correspond to a boot process that restricts or otherwise does not permit access to various security assets or other features of the device. The device may then be configured according to the test boot instructions 316. In this manner, different levels of security may be permitted on the device throughout various stages of a supply chain, thereby permitting testing or debugging at a given stage without providing access to higher level security features.

Figure 4:
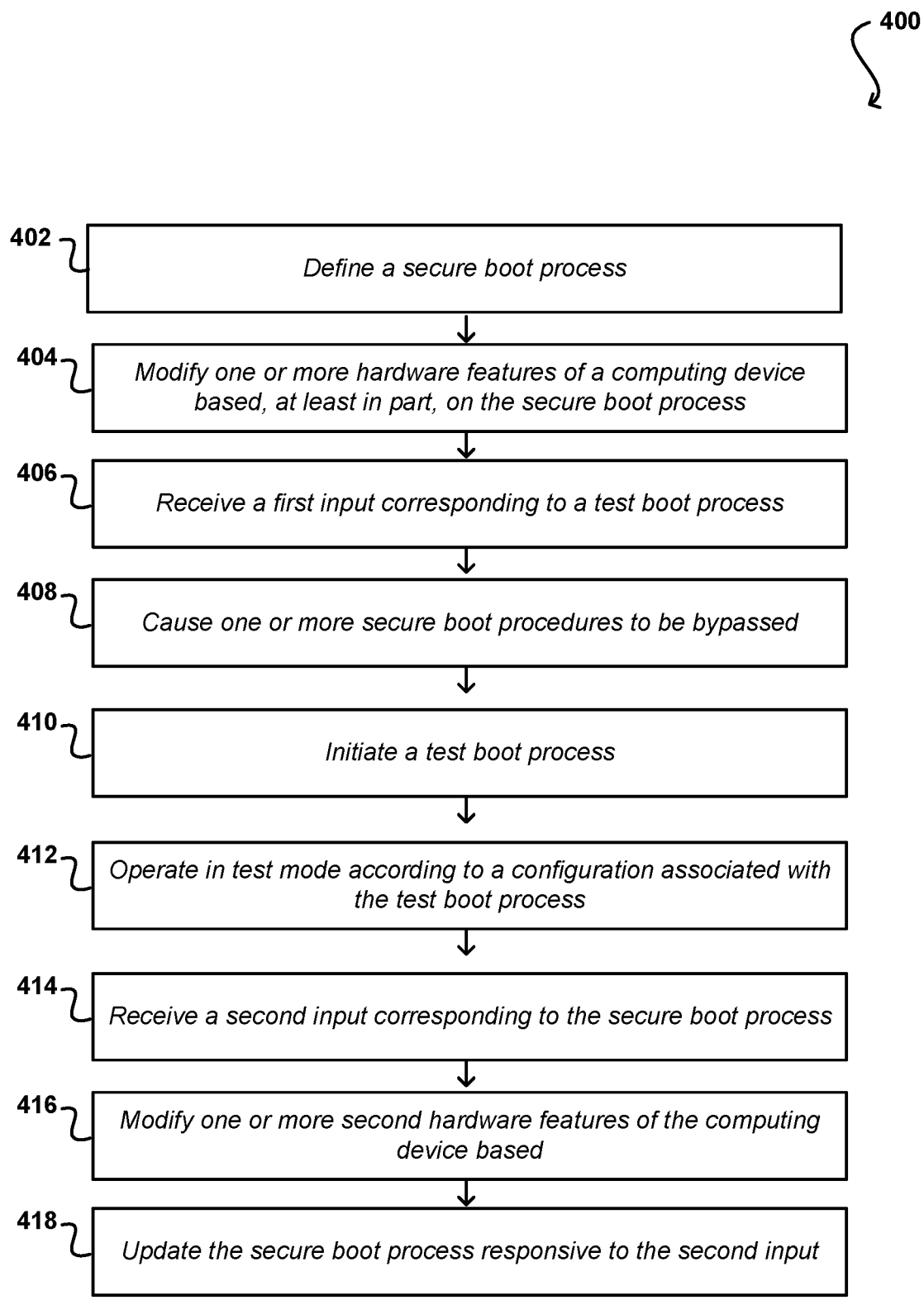
FIG. 4 illustrates an example process for setting and updating a secure boot process that can be utilized in accordance with various embodiments.

FIG. 4 illustrates an example process 400 for defining and updating a secure boot process that can be utilized in accordance with various embodiments. In this example, a secure boot process is defined 402. The secure boot process may correspond to one or more actions taken in response to receiving an input signal corresponding to the secure boot process. This may include loading one or more boot drivers, verifying one or more configuration settings, conducting remote attestation, making permanent changes to NVM, burning fuses, and the like.

One or more hardware features of a computing device may be modified for the secure boot process 404. For example, one or more fuses may be blown to "harden" or otherwise improve security of the computing device. In at least one embodiment, the modification is performed after one or more verifications associated with a secure boot process, such as receiving an appropriate input signal, providing credentials, and the like. The modification to the hardware features may be immutable. Upon restart or removal of power from the computing device, the hardware modifications may remain. In at least one embodiment, a certain set of modifications may be performed at different steps of a supply chain to gradually increase security of the device.

A first input may be received, where the first input corresponds to a signal indicative of a test boot process 406. The test boot process may be different from the secure boot process. For example, the test boot process may load different drivers that may permit use of the device, such as execution of software instructions, but may block or otherwise not permit other functionality, such as connecting to a network, modifying NVM, or the like. The first input may be received at start up, for example after a restart, or may be received along with a restart signal such that test boot will be initiated upon a subsequent restart. In at least one embodiment, responsive to the input corresponding to the test boot, one or more secure boot procedures may be bypassed 408. For example, a measured boot function may be bypassed and/or not performed during a test boot. The test boot may then be initiated 410 where other functions of the device are accessible. One or more operations may occur while operating in test mode 412, such as testing of software or various debugging operations, among others.

A second input may be received that corresponds to the secure boot process 414. The second input may be received along with a signal to initiate a restart of a device or may be provided along with a signal to operate a device after it has been shut down, among other options. Accordingly, it should be appreciated that the second input, which is associated with the secure boot process, may be received at various times such that a reboot associated with the signal will be performed in accordance with the secure boot process. Upon receiving the second input, one or more secure boot drivers may be started, thereby providing the user access to security assets, such as via a measured boot, or the like. This access may be a higher level of access compared to the test boot. While using the device in secure boot, one or more second hardware features may be modified 416 based on instructions provided by a user or by another hardware and/or software component. For example, one or more fuses may be blown, NVM may be modified, and the like. Additionally, various other operations may be performed, such as making changes to one or more boot processes. The secure boot process may then be updated 418, for example to perform or otherwise incorporate changes made. As a result, the device may be operated using different processes, with modifications made during secure boot carrying forward and modifications or programs executed during a test boot being limited to only that particular boot run.

Figure 5:
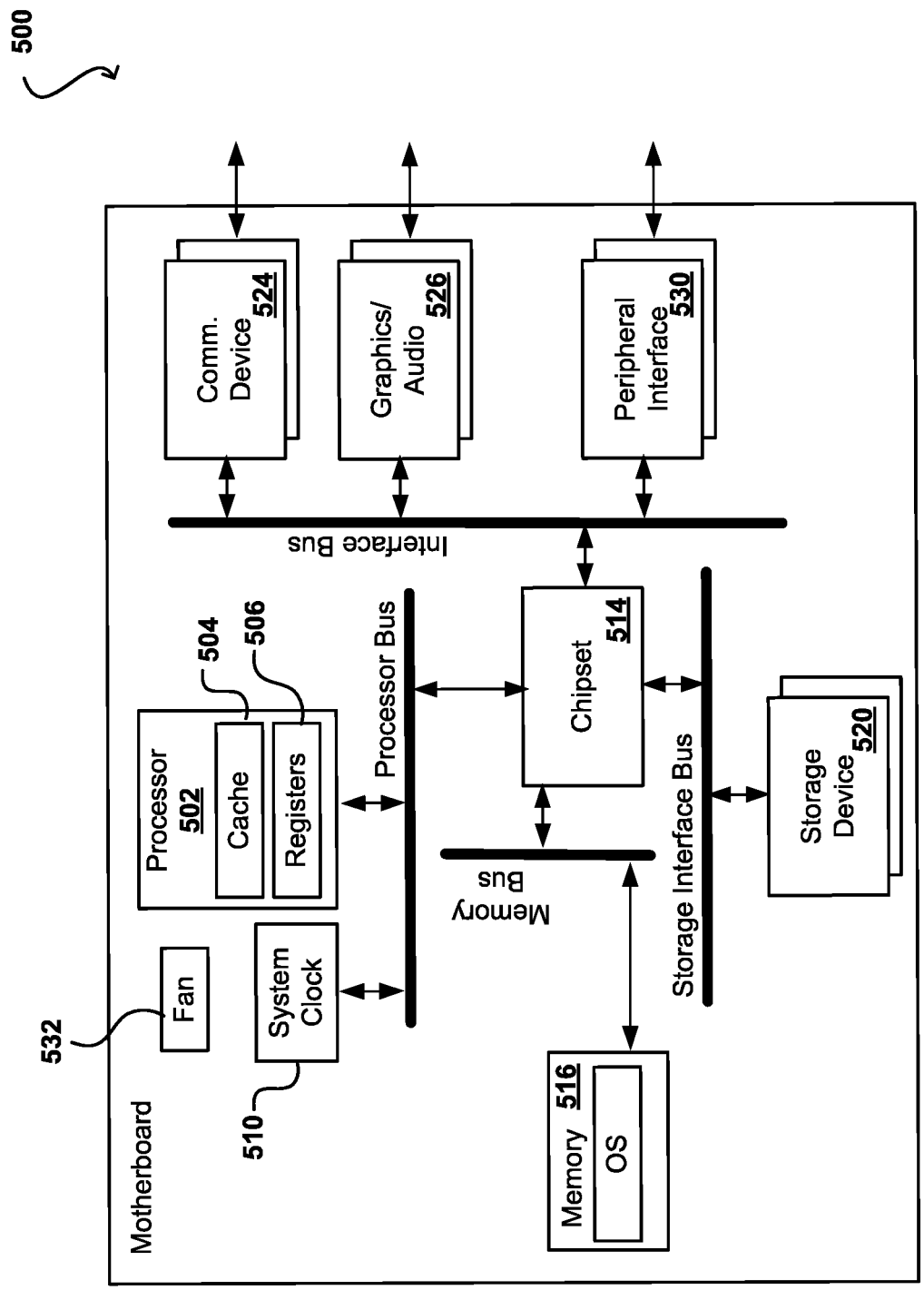
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 330, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
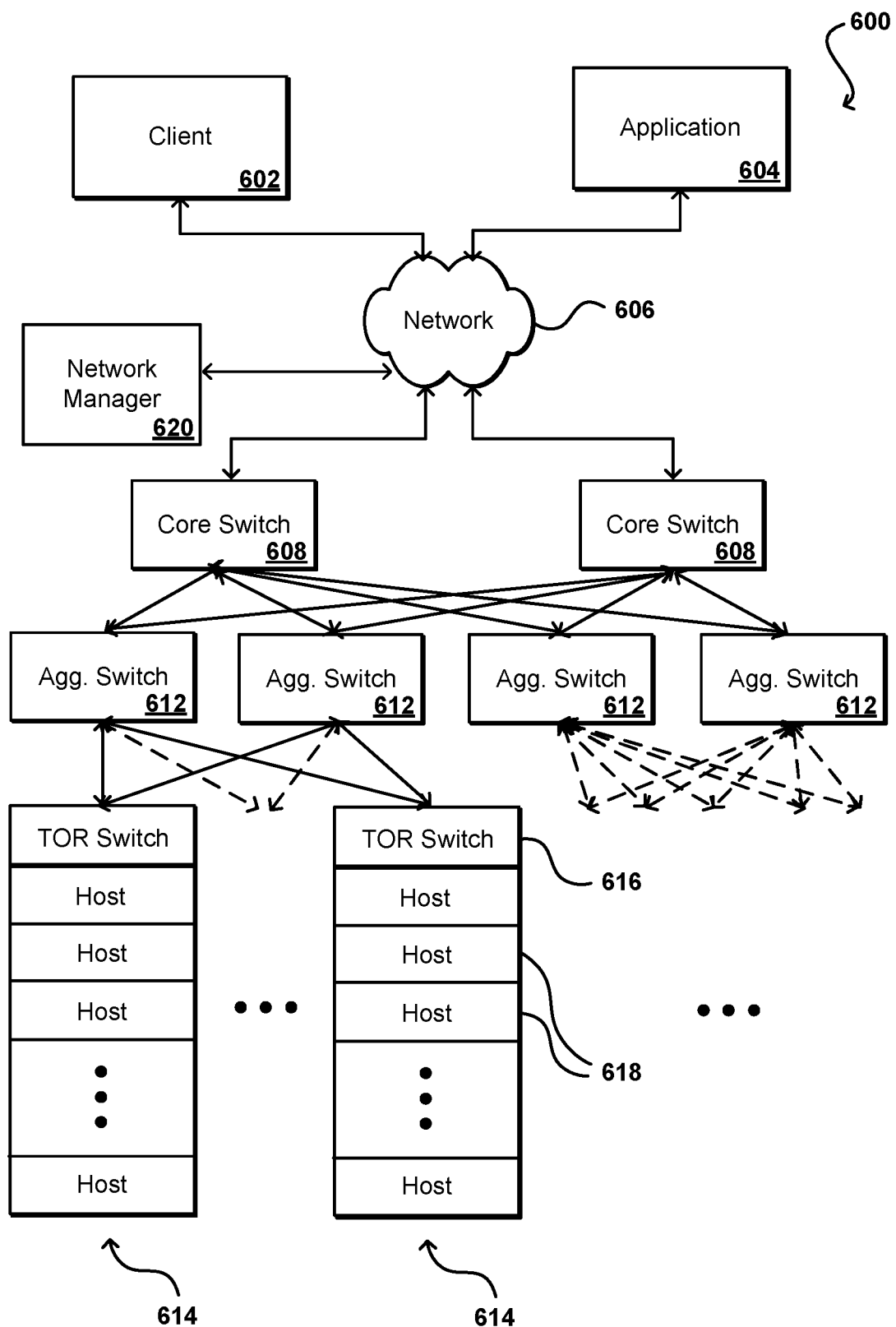
FIG. 6 illustrates components of an example data center environment in which aspects of various embodiments can be implemented.

As mentioned, SoC devices may be utilized in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 7:
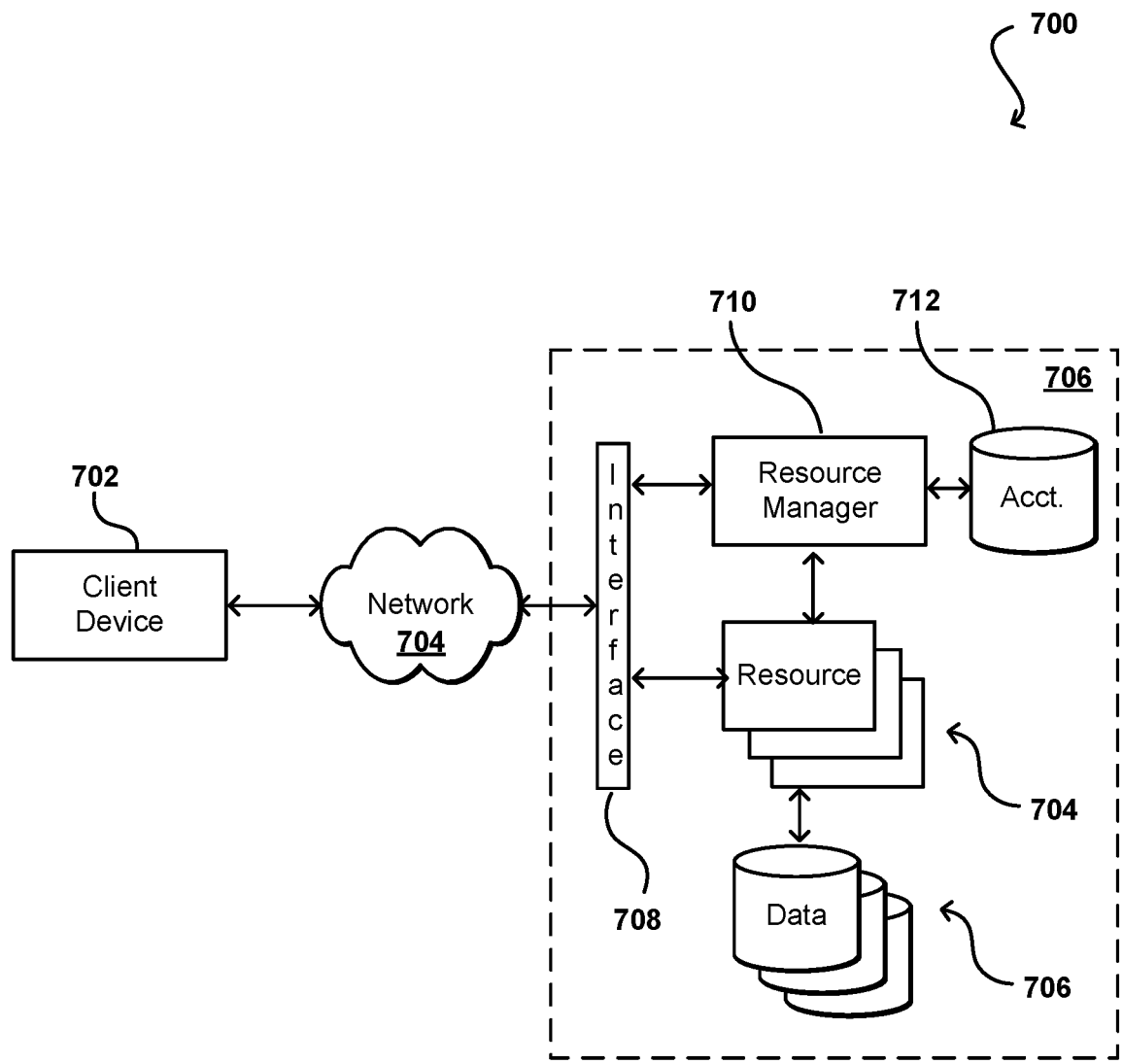
FIG. 7 illustrates components of another example environment in which aspects of various embodiments can be implemented.

As mentioned, such a configuration can be used in some embodiments to provide resource capacity for one or more users or customers as part of a shared resource environment. FIG. 7 illustrates an example of one such environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   initiating a reset of a system on chip (SoC) device;
   receiving a bootstrap signal, including one or more properties associated with access permissions for one or more boot operations, to a boot manager;
   determining, based on the one or more properties, a boot operation of the one or more boot operations corresponds to a test boot;
   responsive to determining the boot operation corresponds to the test boot, bypassing one or more secure boot operations during the test boot;
   responsive to determining the boot operation corresponds to the test boot, causing one or more boot drivers associated with SoC device operation to execute; and
   causing, after the one or more boot drivers are executed, the SoC device to operate using a configuration associated with the test boot.

2. The computer-implemented method of claim 1, wherein the one or more secure boot operations include at least one of a measured boot, a verified boot, or a burning process.

3. The computer-implemented method of claim 1, wherein the bootstrap signal is received at one or more bootstrap pins of an input/output of the SoC device.

4. The computer-implemented method of claim 1, further comprising:
  initiating a second reset of the SoC device;
  receiving a second bootstrap signal to the boot manager;
  determining the second bootstrap signal corresponds to a secure boot;
  responsive to determining the second bootstrap signal corresponds to the secure boot, causing the one or more secure boot operations to execute during the secure boot; and
  causing, after the one or more secure boot operations are executed, the SoC device to operate using a configuration determined based on the second bootstrap signal.

5. The computer-implemented method of claim 1, further comprising:
  responsive to determining the boot operation corresponds to the test boot, disabling one or more operations associated with a fuse burn.

6. A computer-implemented method, comprising:
  receiving an input signal associated with an operational mode for an integrated circuit, the input signal including one or more properties associated with access permissions for one or more operational modes;
  determining, based on the input signal, the operational mode corresponds to a test mode;
  responsive to determining the operational mode corresponds to the test mode, disabling one or more secure boot features; and
  causing the integrated circuit to operate using a configuration associated with the test mode to limit access to one or more security features of the integrated circuit.

7. The computer-implemented method of claim 6, wherein the integrated circuit is a system on chip (SoC) device, the method further comprising:
  executing the input signal after a restart of the SoC device.

8. The computer-implemented method of claim 6, further comprising:
  receiving a second input signal associated with the operational mode for the integrated circuit;
  determining, based on the second input signal, the operational mode corresponds to a secure mode;
  responsive to determining the operational mode correspond to the secure mode, causing the one or more secure boot features to execute;
  causing the integrated circuit to operate using a configuration to permit access to the one or more security features of the integrated circuit based on the second input signal.

9. The computer-implemented method of claim 8, further comprising:
  responsive to determining the operational mode corresponds to the secure mode, permitting one or more operations associated with the one or more security features.

10. The computer-implemented method of claim 9, wherein the modification includes a fuse burn.

11. The computer-implemented method of claim 6, wherein the input signal is received at one or more bootstrap pins of an input/output of the integrated circuit.

12. The computer-implemented method of claim 6, wherein a boot manager is positioned to receive the input signal prior to configuration of the integrated circuit.

13. The computer-implemented method of claim 6, wherein the one or more secure boot features provides to a measured boot operation.

14. The computer-implemented method of claim 6, wherein the one or more secure boot features provides to access to cryptographic material used by a measured boot operation.

15. A system, comprising:
  an integrated circuit device;
  an input/output device to receive a bootstrap signal, including one or more properties associated with access permissions for one or more operational modes; and
  a boot manager including logic to determine an operational mode based on the bootstrap signal, to disable a first portion of a plurality of boot features responsive to determining the operational mode, and to enable a second portion of the plurality of boot features, responsive to determining the operational mode, to configure the integrated circuit device according to the bootstrap signal.

16. The system of claim 15, wherein the boot manager includes logic to further determine the operational mode based on a second bootstrap signal and to cause the plurality of boot features to configure the integrated circuit device according to the second bootstrap signal.

17. The system of claim 16, further comprising:
  a non-volatile memory component, wherein the non-volatile memory component is accessible after the integrated circuit device is configured according to the second bootstrap signal.

18. The system of claim 16, further comprising:
  one or more fuses, wherein an instruction to burn at least one of the one or more fuses is transmittable after the integrated circuit device is configured according to the second bootstrap signal.

19. The system of claim 15, wherein the input/output device includes one or more pins.

20. The system of claim 15, wherein the bootstrap signal is executed after a restart of the integrated circuit device.

\* \* \* \* \*